United States Patent
Mizuno et al.

(10) Patent No.: US 6,870,347 B2
(45) Date of Patent: Mar. 22, 2005

(54) PERMANENT MAGNET SYNCHRONOUS MOTOR DRIVING SYSTEM, AND METHOD OF TESTING PERMANENT MAGNET SYNCHRONOUS MOTOR DRIVING SYSTEM

(75) Inventors: Takayuki Mizuno, Shizuoka (JP); Junichi Takayama, Shizuoka (JP); Yoshitaka Higashi, Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 95 days.

(21) Appl. No.: 10/342,367

(22) Filed: Jan. 15, 2003

(65) Prior Publication Data

US 2003/0132727 A1 Jul. 17, 2003

(30) Foreign Application Priority Data

Jan. 17, 2002 (JP) ........................................ 2000-008437

(51) Int. Cl.[7] ........................ H02K 21/00; G01R 27/26; H02M 7/5395
(52) U.S. Cl. ........................ 318/722; 388/903; 363/40; 361/23
(58) Field of Search ................................ 318/434, 490, 318/563, 599, 623, 700, 720–724; 388/903, 909, 922; 361/23; 363/40

(56) References Cited

U.S. PATENT DOCUMENTS

| | | | |
|---|---|---|---|
| 4,623,830 A | * 11/1986 | Peneder et al. | ............. 318/798 |
| 4,833,584 A | * 5/1989 | Divan | ............. 363/37 |
| 5,128,853 A | * 7/1992 | Heinle | ............. 363/41 |
| 5,661,390 A | * 8/1997 | Lipo et al. | ............. 318/803 |
| 6,101,866 A | 8/2000 | Shiozaki et al. | |
| 6,151,228 A | * 11/2000 | Miyazaki et al. | ............. 363/48 |
| 6,166,929 A | * 12/2000 | Ma et al. | ............. 363/37 |
| 6,264,005 B1 | 7/2001 | Kang et al. | |
| 6,614,991 B2 | * 9/2003 | Zeh | ............. 318/801 |

FOREIGN PATENT DOCUMENTS

| | | |
|---|---|---|
| JP | 63-190594 A | 8/1988 |
| JP | 3-145995 A | 6/1991 |
| JP | 2000-83396 A | 3/2000 |

OTHER PUBLICATIONS

S. Ogasawara, "Theory of Electricity—D", T.IEE Japan, vol. 118, No. 9, 1998, pp. 975–980.

Fuji Jiho, vol. 74, No. 11, 2001, pp. 614–615.

* cited by examiner

*Primary Examiner*—Bentsu Ro
(74) *Attorney, Agent, or Firm*—Foley & Lardner LLP

(57) ABSTRACT

A permanent magnet synchronous motor driving system includes: 1) a permanent magnet synchronous motor, and 2) an inverter. The permanent magnet synchronous motor includes three phase terminals. A resonant frequency is generated between an inductance and a ground electrostatic capacitance which are measured between the following: a) one of the three phase terminals of the permanent magnet synchronous motor, and b) a ground. The inverter drives the permanent magnet synchronous motor. The inverter generates a carrier frequency. The resonant frequency of the permanent magnet synchronous motor is free from a conformance with the carrier frequency of the inverter and is free from a proximity of the carrier frequency of the inverter.

18 Claims, 5 Drawing Sheets

HIGH FREQUENCY DISTRIBUTED CONSTANT EQUIVALENT CIRCUIT {FOR 1 PHASE}

La : ARMATURE REACTION INDUCTANCE (WINDING RESISTANCE AND LEAKAGE INDUCTANCE UNDER CONSIDERATION BY DISTRIBUTED CONSTANT CIRCUIT)
$\Delta R_0$, $\Delta R_{01}$, $\Delta R_{02}$ : RESISTANCE {FOR 1 SLOT} OF CURRENT PATH INCLUDING IRON CORE, WINDING, INSULATOR AND THE LIKE
$\Delta L_0$ : LEAKAGE INDUCTANCE {FOR 1 SLOT}
$\Delta C_m$ : ELECTROSTATIC CAPACITANCE {FOR 1 SLOT} BETWEEN WINDINGS
$\Delta C_0$ : ELECTROSTATIC CAPACITANCE {FOR 1 SLOT} BETWEEN WINDING AND IRON CORE (GROUND)

FREQUENCY CHARACTERISTIC OF
0-PHASE ELECTROSTATIC CAPACITANCE
(EARLIER TECHNOLOGY)

FREQUENCY CHARACTERISTIC BETWEEN 1-PHASE
TERMINAL AND GROUND (PRESENT)

FIG. 3

HIGH FREQUENCY DISTRIBUTED CONSTANT
EQUIVALENT CIRCUIT {FOR 1 PHASE}

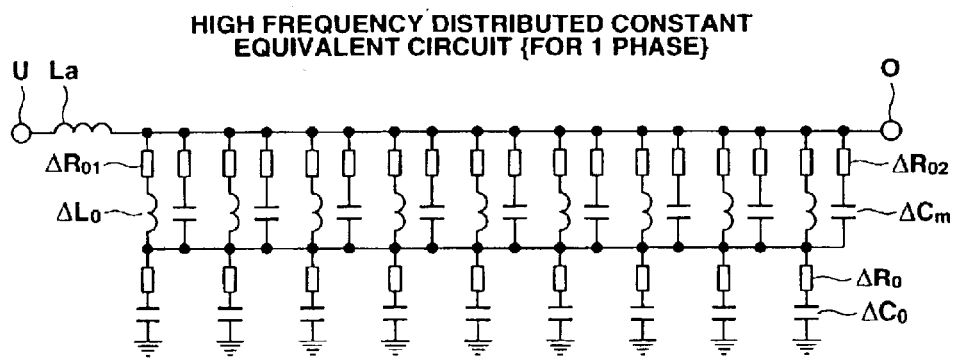

- $La$ : ARMATURE REACTION INDUCTANCE (WINDING RESISTANCE AND LEAKAGE INDUCTANCE UNDER CONSIDERATION BY DISTRIBUTED CONSTANT CIRCUIT)
- $\Delta R_0, \Delta R_{01}, \Delta R_{02}$ : RESISTANCE {FOR 1 SLOT} OF CURRENT PATH INCLUDING IRON CORE, WINDING, INSULATOR AND THE LIKE
- $\Delta L_0$ : LEAKAGE INDUCTANCE {FOR 1 SLOT}
- $\Delta C_m$ : ELECTROSTATIC CAPACITANCE {FOR 1 SLOT} BETWEEN WINDINGS
- $\Delta C_0$ : ELECTROSTATIC CAPACITANCE {FOR 1 SLOT} BETWEEN WINDING AND IRON CORE (GROUND)

FIG. 4

HIGH FREQUENCY DISTRIBUTED CONSTANT
EQUIVALENT CIRCUIT {FOR 1 PHASE}

- $La$ : ARMATURE REACTION INDUCTANCE
- $R_{01}, R_{011}, R_{021}$ : RESISTANCE OF CURRENT PATH INCLUDING IRON CORE, WINDING, INSULATOR AND THE LIKE
- $L_{01}$ : LEAKAGE INDUCTANCE
- $C_{m1}$ : ELECTROSTATIC CAPACITANCE BETWEEN WINDINGS
- $C_{01}$ : ELECTROSTATIC CAPACITANCE BETWEEN WINDING AND IRON CORE (GROUND)

FIG. 5

EQUIVALENT CIRCUIT BETWEEN HIGH FREQUENCY 1-PHASE TERMINAL AND GROUND

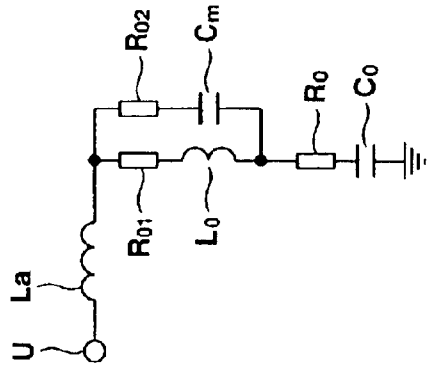

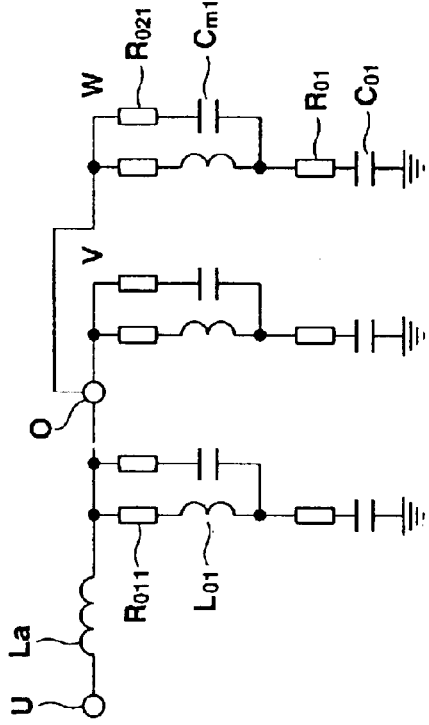

(a) Y-CONNECTION OF 1-PHASE EQUIVALENT CIRCUIT  (b) CONCENTRATED CONSTANT CIRCUIT $L_a$ : ARMATURE REACTION INDUCTANCE
$R_0, R_{01}, R_{02}$ : RESISTANCE {FOR 3 PHASES} OF CURRENT PATH INCLUDING IRON CORE, WINDING, INSULATOR AND THE LIKE {FOR 3 PHASES}
$L_0$ : LEAKAGE INDUCTANCE {FOR 3 PHASES}
$C_m$ : ELECTROSTATIC CAPACITANCE {FOR 3 PHASES} BETWEEN WINDINGS {FOR 3 PHASES}
$C_0$ : ELECTROSTATIC CAPACITANCE {FOR 3 PHASES} BETWEEN WINDING AND IRON CORE (GROUND) {FOR 3 PHASES}

MEASUREMENT OF CONSTANT

SLOT DIMENSIONS
(SLOT WIDTH aaa, SLOT HEIGHT bbb)

FREQUENCY CHARACTERISTIC WITH RESONANT FREQUENCY OF CAPACITANCE $\sqrt{2}$ TIMES

PERMANENT MAGNET SYNCHRONOUS MOTOR DRIVING SYSTEM, AND METHOD OF TESTING PERMANENT MAGNET SYNCHRONOUS MOTOR DRIVING SYSTEM

BACKGROUND OF THE INVENTION

1. Field of the Invention

The present invention relates to a permanent magnet synchronous motor driving system, and a method of testing the permanent magnet synchronous motor driving system.

More specifically, the permanent magnet synchronous motor under the present invention is so devised as to have its leakage current reduced.

The permanent magnet synchronous motor under the present invention is effectively used for an elevator.

2. Description of the Related Art

In general, a permanent magnet synchronous motor (hereinafter referred to as "PM motor" if necessary for convenience sake) has a winding of 2-layer lap type (conventionally used). The PM motor for an elevator is supposed to have an inductive voltage waveform shaped substantially into sinusoid (sine curve) and to reduce torque ripple. Therefore, slot number Q (the number of slots) is, in general, likely to be maximized per pole and per phase.

The PM motor for a gearless hoist has low rotation speed, thus requiring multiple poles. Adopting the 2-layer lap winding into the PM motor for the gearless hoist is likely to further increase the slot number Q. With this, a floating capacitance (electrostatic capacitance) between a winding terminal and ground is likely to increase, thus causing a leakage current with ease. Especially, variably driving the PM motor by means of an inverter is likely to cause the leakage current having high frequency.

Hereinafter described is why variably driving the PM motor by means of the inverter is likely to cause the leakage current.

Recently, high speed power device such as IGBT (=Insulated Gate Bipolar Transistor) has been developed, thus increasing carrier frequency (in other words, switching frequency) of the inverter. Thereby, switching the inverter changes voltage rapidly.

Switching the inverter causes a normal mode voltage (for providing a load current) as well as a common mode voltage. In accordance with the switching state of the inverter, the common mode voltage may change rapidly in such a manner as to form steps. Being totally free from any influence by the current flowing through the load or by an impedance of the load, the common mode voltage can be regarded as a potential of an entire load relative to a standard potential. The common mode voltage has a physical meaning of "zero-phase voltage" which is defined by a coordinate transformation.

FIG. 9 shows a driving system for variably driving a permanent magnet synchronous motor 1 (hereinafter referred to as "PM motor 1"). A rectifier 2 rectifies a three-phase alternating current of a three-phase power source 3 into a direct current. Subsequently, a voltage source PWM inverter 4 supplies the alternating current volts (having variable frequency) to the PM motor 1, where PWM stands for Pulse Width Modulation. With the above operations, the PM motor 1 can be driven variably.

Switching the power device of the voltage source PWM inverter 4 may rapidly change the common mode voltage (which is caused by the voltage source PWM inverter 4) in such a manner as to form steps. Thus, the leakage current is caused to flow from a motor frame to a ground terminal via the floating capacitance of a PM motor winding.

Conventionally, making greater zero-phase impedance, namely, reducing the floating capacitance (electrostatic capacitance) was under consideration in various manners.

It has been proved, however, that taking only the zero-phase impedance into account cannot reduce the leakage currently effectively. More specifically described as follows:

FIG. 1 shows a frequency characteristic of electrostatic capacitance (component of zero-phase) of the PM motor for the gearless hoist, describing measurement of the electrostatic capacitance between three-phase terminals (block) and the ground, according to an earlier technology. An LCR meter is used for measuring the variable frequency, where LCR means Inductance, Capacitance and Resistance. The graph in FIG. 1 has an abscissa depicting the frequency measured in logarithmic scale and an ordinate depicting the electrostatic capacitance measured in logarithmic scale.

Each of a PM motor A and a PM motor B in FIG. 1 shows measured frequency which is stable in a range smaller than or equal to 10.0 kHz. The PM motor A and the PM motor B are, in general, driven by means of the inverter having its carrier frequency smaller than or equal to 10.0 kHz. The thus driven PM motor A and the PM motor B are unlikely to increase the current remarkably, although some leakage current may occur due to ununiformity in the electrostatic capacitance (some are great and others are small).

Notwithstanding the above, the leakage current, as the case may be, occurs in the amount greater than or equal to that which is determined by the electrostatic capacitance measured in FIG. 1.

FIG. 2 shows a frequency characteristic of electrostatic capacitance of the PM motor for the gearless hoist, describing measurement of the electrostatic capacitance between one-phase (U-phase) terminal and the ground. Herein, the PM motor A and the PM motor B in FIG. 2 are those used for the measurement in FIG. 1. The LCR meter is used for measuring the variable frequency. The graph in FIG. 2 has an abscissa depicting the frequency measured in logarithmic scale and an ordinate depicting the electrostatic capacitance measured in logarithmic scale.

In the proximity of the measured frequency of 6.0 kHz in FIG. 2, the PM motor A has its peak electrostatic capacitance attributable to a resonance. On the other hand, in the proximity of the measured frequency of 10.0 kHz in FIG. 2, the PM motor B has its peak electrostatic capacitance attributable to the resonance. The measured frequency corresponding to each of the peak electrostatic capacitances is referred to as "resonant frequency."

Each of the PM motor A and the PM motor B is driven with the PWM inverter having its main circuit component adopting the IGBT. In general, the PWM inverter has the carrier frequency (in other words, switching frequency) in a range from 5.0 kHz to 15.0 kHz. In sum, the resonant frequency generated between an inductance and a ground electrostatic capacitance of the PM motor A in FIG. 1 is likely to conform with the carrier frequency of the PWM inverter, likewise, the resonant frequency generated between an inductance and a ground electrostatic capacitance of the PM motor B in FIG. 1 is likely to conform with the carrier frequency of the PWM inverter.

The electrostatic capacitance in the low frequency range (smaller than or equal to 1.0 kHz) in FIG. 1 is relatively low. However, the carrier frequency of the PWM inverter conforming with the resonant frequency may greatly increase the electrostatic capacitance, thus increasing the leakage current.

In sum, taking only the zero-phase impedance (namely impedance having component of zero-phase) into account according to the earlier technology is not sufficient for effectively reducing the leakage current. In other words, in addition to the zero-phase impedance, studying a resonant point between the one-phase terminal and the ground is of importance.

Especially, the PM motor for the gearless hoist is, in general, low in speed and low in frequency, thereby becoming great in the number of windings and thereby increasing impedance. With this, the PM motor for the gearless hoist becomes great in ground electrostatic capacitance as well as winding impedance. These features of the PM motor for the gearless hoist are likely to lower the resonant frequency. The thus lowered resonant frequency of the PM motor is likely to conform with the carrier frequency of the inverter.

BRIEF SUMMARY OF THE INVENTION

It is an object of the present invention to provide a permanent magnet synchronous motor driving system having a permanent magnet synchronous motor that can reduce a leakage current by preventing a resonant frequency (causing a peak electrostatic capacitance of the permanent magnet synchronous motor [in other words, referred to as "PM motor"]) from conforming with a carrier frequency (switching frequency) of an inverter. Hereinabove, the resonant frequency is generated between an inductance and a ground electrostatic capacitance of the permanent magnet synchronous motor.

It is another object of the present invention to provide a method of testing the permanent magnet synchronous motor driving system.

According to a first aspect of the present invention, there is provided a permanent magnet synchronous motor driving system, comprising:
1) a permanent magnet synchronous motor including three phase terminals, a resonant frequency being generated between an inductance and a ground electrostatic capacitance which are measured between the following:
   a) one of the three phase terminals of the permanent magnet synchronous motor, and
   b) a ground; and
2) an inverter for driving the permanent magnet synchronous motor, the inverter generating a carrier frequency, the resonant frequency of the permanent magnet synchronous motor being free from a conformance with the carrier frequency of the inverter and being free from a proximity of the carrier frequency of the inverter.

According to a second aspect of the present invention, there is provided a method of testing a permanent magnet synchronous motor driving system, the method comprising the following operations:
i) disposing on an insulated bench a permanent magnet synchronous motor of the permanent magnet synchronous motor driving system, the permanent magnet synchronous motor driving system comprising:
  1) the permanent magnet synchronous motor including three phase terminals, a resonant frequency being generated between an inductance and a ground electrostatic capacitance which are measured between the following:
    a) one of the three phase terminals of the permanent magnet synchronous motor, and
    b) a ground; and
  2) an inverter for driving the permanent magnet synchronous motor, the inverter generating a carrier frequency, the resonant frequency of the permanent magnet synchronous motor being free from a conformance with the carrier frequency of the inverter and being free from a proximity of the carrier frequency of the inverter;
ii) measuring a ground electrostatic capacitance in a frequency range smaller than or equal to substantially 1.0 kHz, between one of the three phase terminals of the permanent magnet synchronous motor and the ground;
iii) measuring, in a high frequency range, the resonant frequency between the inductance and the ground electrostatic capacitance; and
iv) calculating a constant for determining a characteristic of an electrostatic capacitance.

The other objects and features of the present invention will become understood from the following description with reference to the accompanying drawings.

BRIEF DESCRIPTION OF THE SEVERAL VIEWS OF THE DRAWINGS

FIG. 3 shows a high frequency distributed constant equivalent circuit (having component of one-phase) of a permanent magnet synchronous motor.

FIG. 4 shows a high frequency concentrated constant equivalent circuit (having component of one-phase) of the permanent magnet synchronous motor.

FIG. 5 shows an equivalent circuit between high frequency one-phase terminal of the permanent magnet synchronous motor, and the ground, in which FIG. 5($a$) shows a Y-connection of the one-phase equivalent circuit, and FIG. 5($b$) shows a concentrated constant circuit.

DETAILED DESCRIPTION OF THE EMBODIMENT

Figure 1:
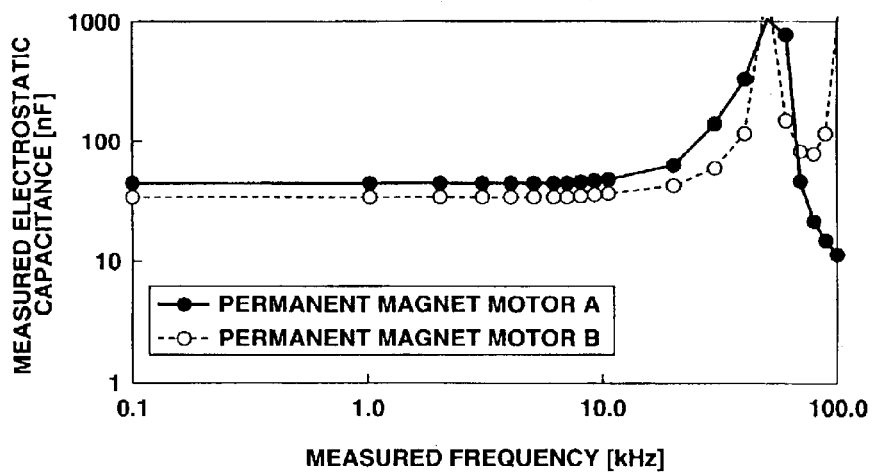
FIG. 1 shows a frequency characteristic of electrostatic capacitance (component of zero-phase), according to an earlier technology.

In the following, various embodiments of the present invention will be described in detail with reference to the accompanying drawings.

<Theory of the Present Invention>

Various kinds of studies have been done on a leakage current from a motor driven by a PWM inverter. What is used for the studies is a distributed constant circuit. The distributed constant circuit is complicated, thus leaving no unified method or clarified literature. This <Theory of the present invention> describes a simple equivalent circuit and a simple method of determining the constant, for calculating the following elements:
1. Low frequency ground electrostatic capacitance which is of importance for designing the motor.
2. Frequency causing increased electrostatic capacitance (resonant frequency).

(1) High Frequency Equivalent Circuit

FIG. 3 shows a high frequency distributed constant equivalent circuit of a permanent magnet synchronous motor (hereinafter referred to as "PM motor" if necessary for convenience sake). The high frequency distributed constant equivalent circuit in FIG. 3 has component of one-phase. In FIG. 3, windings of slots connect to ground and connect with each other, via resistance, inductance, and floating capacitance.

The high frequency distributed constant equivalent circuit in FIG. 3 causes leakage currents from the respective slots. The leakage currents are assumed to flow in parallel with each other, when the leakage currents are viewed from a PM motor terminal.

The above assumption of the leakage currents is based on that a main current flowing from a U-terminal to a neutral conductor is unlikely to be influenced by the distributed constant circuit. In addition, many of the leakage currents become zero-phase component. Thus, mutual induction with other phase(s) is unlikely to be influential (ignorable). In sum, the above assumptions can greatly simplify handling and simulating the equivalent circuit.

Studying the zero-phase impedance of the three-phase is not influenced by an armature reaction inductance La, thus making the La in FIG. 3 ignorable.

All the constants ($\Delta R_0$, $\Delta R_{01}$, $\Delta R_{02}$, $\Delta L_0$, $\Delta C_m$, $\Delta C_0$) of the respective slots of the high frequency distributed constant equivalent circuit in FIG. 3 are connected in parallel with each other. Thereby, the constants in the mass can be represented as a concentrated constant circuit. FIG. 4 shows a high frequency concentrated constant equivalent circuit having component of one-phase.

(2) Equivalent Circuit Between One-phase Terminal and Ground

In general, the PM motor has a Y-connection. Thus, the equivalent circuit between the one-phase terminal and the ground can be obtained by Y-connecting the equivalent circuit in FIG. 4. FIG. 5(a) shows the thus obtained equivalent circuit. Herein, the phases that are not measured can be regarded as the zero-phase, and therefore the armature reaction inductance La can be omitted (ignorable). Moreover, the constants (R01, R011, R021, L01, Cm1, C01) of the respective phases are in parallel with each other, thus the constants can be concentrated as is seen in FIG. 5(b).

In the equivalent circuit (concentrated constant circuit) in FIG. 5(b), an impedance Zue between the one-phase terminal and the ground can be given by the following expression (1) and expression (2), with the resistance ignored for simplification.

$$Zue = \frac{1 - \omega^2 \cdot L0 \cdot (C0 + Cm) - \omega^2 \cdot La \cdot C0 \cdot (1 - \omega^2 \cdot L0 \cdot Cm)}{j \cdot \omega \cdot C0 \cdot (1 - \omega^2 \cdot La \cdot Cm)} \quad (1)$$

$$= \frac{1}{j \cdot \omega \cdot C0 \cdot \frac{1 \cdot \omega^2 \cdot L0 \cdot Cm}{1 - \omega^2 \cdot L0 \cdot (C0 + Cm) - \omega^2 \cdot La \cdot C0 \cdot (1 - \omega^2 \cdot L0 \cdot Cm)}}$$

$$\equiv \frac{1}{j \cdot \omega \cdot Cue}$$

where $\omega = 2 \cdot \pi \cdot f$ (f: measured frequency)

$$Cue = C0 \cdot \frac{1 - \omega^2 \cdot L0 \cdot Cm}{1 - \omega^2 \cdot L0 \cdot (C0 + Cm) - \omega^2 \cdot La \cdot C0 \cdot (1 - \omega^2 \cdot La \cdot Cm)} \quad (2)$$

The thus given Cue is an apparent electrostatic capacitance between the one-phase terminal and the ground.

Moreover in this case, the armature reaction inductance La is far greater than a leakage inductance L0 (La>>L0). In addition, in the proximity of a resonant frequency between the armature reaction inductance La and a ground electrostatic capacitance C0, 1>>$\omega^2 \cdot L0 \cdot C0$ can be given. Thus, the expression (2) can be approximated to the following expression (3). Moreover, the expression (3) can lead the following expression (4).

$$Cue = \frac{C0}{1 - \omega^2 \cdot La \cdot C0} \quad (3)$$

$$f0 = \frac{1}{2 \cdot \pi \cdot \sqrt{La \cdot C0}} \quad (4)$$

(3) Calculate Constants (Ground Electrostatic Capacitance C0 and Armature Reaction Inductance La)

Figure 2:
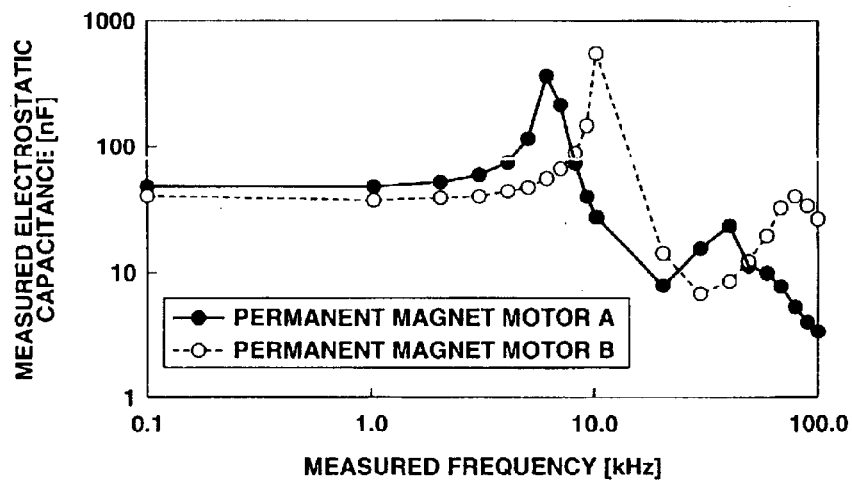
FIG. 2 shows a frequency characteristic of the electrostatic capacitance between one-phase terminal and ground (present).

FIG. 2, the expression (3) and the expression (4) can help obtain the constants (ground electrostatic capacitance C0 and armature reaction inductance La) for calculating the electrostatic capacitance of the PM motor.

In FIG. 2, the measured frequency range smaller than or equal to 1.0 kHz (relatively low) shows the stabilized electrostatic capacitance. Moreover, the expression (3) leads the following expression (5) with the small $\omega$:

$$Cue = C0 \quad (5)$$

In sum, the measured frequency smaller than or equal to 1.0 kHz (relatively low) can help obtain the ground electrostatic capacitance C0 between the winding and an iron core (ground).

Subsequently, measuring the electrostatic capacitance by varying the measured frequency can obtain the resonant frequency f0 causing the maximum electrostatic capacitance. The thus obtained resonant frequency f0 and the ground electrostatic capacitance C0 can lead the following expression (6) to obtain the armature reaction inductance La:

$$La = 1/(\omega_c^2 \cdot C0) \quad (6)$$

where $\omega_c$ is an angular frequency of a carrier frequency fc of the inverter.

Figure 6:
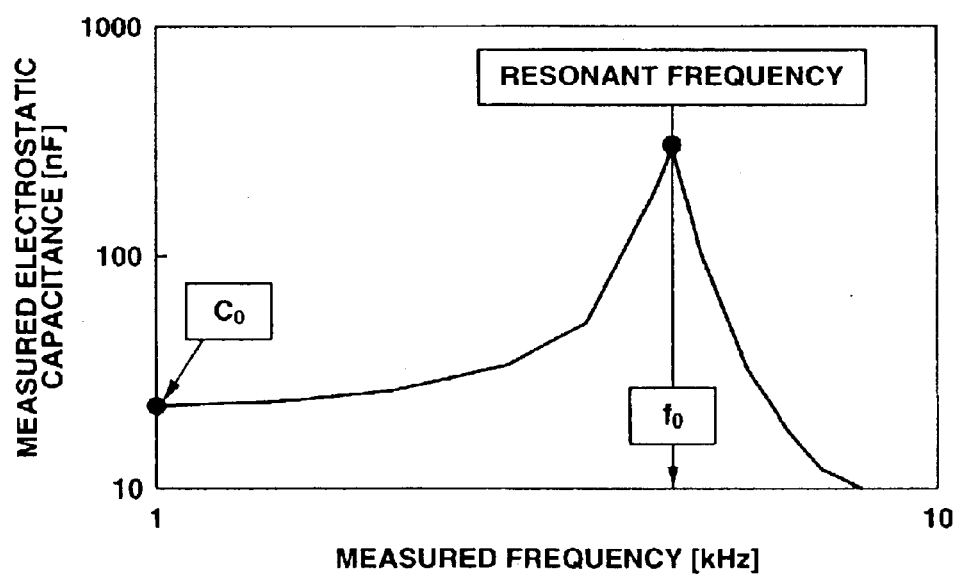
FIG. 6 shows measurement of the constant.

FIG. 6 shows measurement point of the constant.

Hereinabove, the measured electrostatic capacitance of the PM motor depends on setting condition of the PM motor. In this case, the PM motor is disposed on an insulated bench for measurement of the electrostatic capacitance between the one-phase terminal (arbitrary) and the motor frame.

<First Embodiment>

The above <Theory of the present invention> describes the clarified method of measuring and calculating the resonant frequency causing the increased electrostatic capacitance of the PM motor. With this, changing the constants (ground electrostatic capacitance C0 and armature reaction inductance La) of the PM motor, and changing the carrier frequency of the inverter can prevent the resonant frequency from conforming with or approaching the carrier frequency of the inverter.

Practical design of the PM motor calculates the ground electrostatic capacitance C0 between the winding and the iron core (ground) in the following expression (7), and the armature reaction inductance La in the following expression (8).

Figure 7:
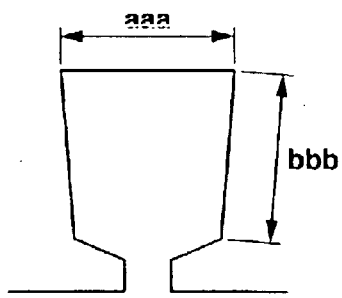
FIG. 7 shows slot dimensions, including a slot width aaa and a slot height bbb.

C0: ground electrostatic capacitance between winding and iron core (ground)

$$C0 = \frac{\varepsilon_0 \times \varepsilon_r \times (a + b) \times L \times Ns}{t} \quad (7)$$

where:

$\varepsilon_0$ is dielectric constant (permittivity) of vacuum {≈8.854×10$^{-12}$ (F/m)}, $\epsilon_r$ is dielectric constant (permittivity) of ground insulator, relative to the dielectric constant (permittivity) of vacuum,
L is iron core length (m),
Ns is slot number (the number of slots),
t is thickness of the ground insulator (m),
aaa is slot width (m)—refer to FIG. 7, and
bbb is slot height (m)—refer to FIG. 7.
La: Armature reaction inductance $$La = 0.7 \times \frac{\tau \times L \times (W \times kw)^2}{p \times \delta \times kc \times ks} \times 10^{-6} \tag{8}$$

where:
τ is polar pitch (m),
L is iron core length (m),
W is the number of serial windings,
kw is winding coefficient,
p is the number of pairs of poles (wherein one pair includes one N-pole and one S-pole),
δ is equivalent gap length (m),
kc is a Carter's coefficient, and
ks is a saturation coefficient.
Remark:
1. For surface magnet type, the equivalent gap length δ is air gap added by magnet thickness.
2. For magnet-embedded type, the equivalent gap length δ is an equivalent length on q-axis increasing the inductance.

The resonant frequency f0 causing the increased electrostatic capacitance can be given by the expression (4). The constants (ground electrostatic capacitance C0 and armature reaction inductance La) of the PM motor are supposed to be determined in such a manner that the resonant frequency f0 is away from the carrier frequency fc of the inverter. In other words, the resonant frequency f0 does not conform with the carrier frequency fc, or is not in the proximity of the carrier frequency fc.

The above description can be paraphrased as below:
The permanent magnet synchronous motor driving system includes the PM motor used for hoisting and lowering the cage of the elevator, and the inverter for driving the PM motor. In the above permanent magnet synchronous motor driving system, the constants (ground electrostatic capacitance C0 and armature reaction inductance La) of the PM motor and the carrier frequency fc of the inverter are so determined as to prevent the resonant frequency f0 from conforming with the carrier frequency fc of the inverter or from being in the proximity of the carrier frequency fc of the inverter, thus reducing the leakage current from the PM motor.

Herein, the PM motor may have an outside stator and an inside rotor. Otherwise, the PM motor may have an inside stator and an outside rotor.

<Second Embodiment>
For preventing the carrier frequency fc of the inverter from conforming with the resonant frequency f0 (which causes the increased electrostatic capacitance of the PM motor), the electrostatic capacitance and the inductance La of the PM motor are so designed as to obtain the resonant frequency f0 greater than or equal to $2^{1/2}$ times the carrier frequency fc of the inverter.

Figure 8:
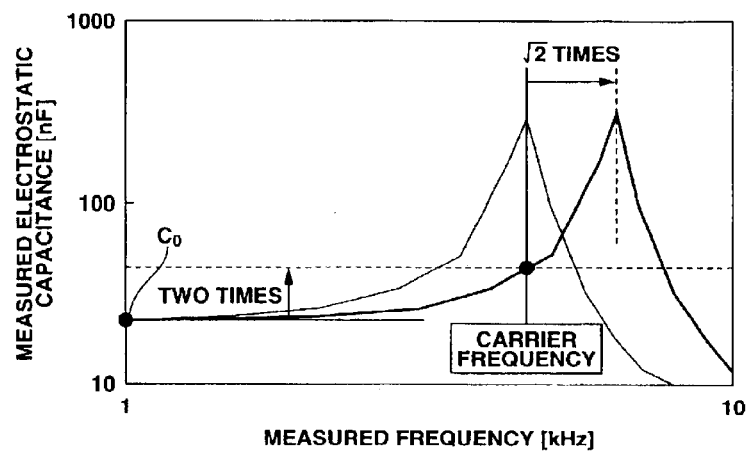
FIG. 8 shows a frequency characteristic with a resonant frequency f0 of the electrostatic capacitance $2^{1/2}$ times a carrier frequency fc of an inverter
Figure 9:
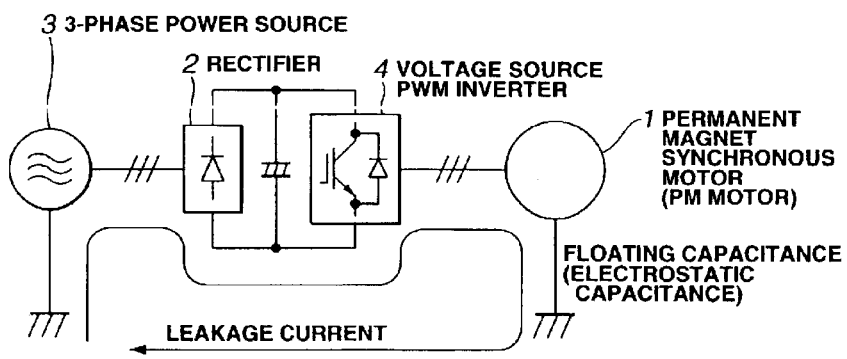
FIG. 9 shows a schematic of circuit of a permanent magnet synchronous motor driving system.

With the resonant frequency f0 greater than or equal to $2^{1/2}$ times the carrier frequency fc of the inverter, the PM motor's electrostatic capacitance corresponding to the carrier frequency fc can be given by the expression (3) and the expression (4), as is seen in FIG. 8. More specifically, the PM motor's electrostatic capacitance corresponding to the carrier frequency fc is smaller than or equal to two times the ground electrostatic capacitance C0, thus preventing remarkable increase in the leakage current.

Practically, the inverter (three-phase, 200 V) has its primary side for inserting an ordinary ground leakage breaker, and its secondary side for detecting the leakage current. Measuring the ground electrostatic capacitance on the secondary side of the inverter may read about 50 nF.

With a small room taken into account, a maximum of 40 nF is allowable for the electrostatic capacitance. Furthermore, with the electrostatic capacitance's increase attributable to the resonance taken into account, the PM motor is so designed as to have the ground electrostatic capacitance C0≦20 nF.

As is seen in FIG. 2, the present PM motor for the gearless hoist has the ground electrostatic capacitance C0 in a range from 30 nF to 45 nF. Taking design change point into account, the allowable electrostatic capacitance is supposed to vary properly in a range from C0 to 2 C0.

In the practical design of the PM motor, the ground electrostatic capacitance C0 can be given in the expression (7), while the armature reaction inductance La can be given in the expression (8). Thereby, the following expression (9) including the carrier frequency fc can be converted into the following expression (10). The ground electrostatic capacitance C0 and the armature reaction inductance La are to be so determined as to satisfy the expression (10).

$$f0 = \frac{1}{2 \cdot \pi \cdot \sqrt{La \cdot C0}} \geq \sqrt{2} \times fc \tag{9}$$

$$La \times C0 \leq \frac{1}{2 \cdot \omega_c^2} \tag{10}$$

where $\omega_c = 2 \cdot \pi \cdot fc$

<Third Embodiment>
Satisfying the expression (9) and the expression (10) described above is based on a premise that other systems and a protector (such as the ground leakage breaker) can be free from any malfunction (operational error) even when the electrostatic capacitance of the PM motor becomes two times the ground electrostatic capacitance C0.

For achieving the above, the ground electrostatic capacitance C0 of the PM motor is set smaller than or equal to 40% of an allowable electrostatic capacitance for the system.

Practically, the inverter (three-phase, 200 V) has its primary side for inserting the ordinary ground leakage breaker, and its secondary side for detecting the leakage current. Measuring the ground electrostatic capacitance on the secondary side of the inverter may read about 50 nF.

With a small room taken into account, a maximum of 40 nF is allowable for the electrostatic capacitance. Furthermore, with the electrostatic capacitance's increase attributable to the resonance taken into account, the PM motor is so designed as to have the ground electrostatic capacitance C0≦20 nF.

More specifically, the slot dimensions (slot width aaa and slot height bbb) and the slot number Ns in the expression (7) can determine the ground electrostatic capacitance C0. The thus determined ground electrostatic capacitance C0 can subsequently determine the armature reaction inductance La to satisfy the following expression (10-1) which is modified from the expression (10):

$$La \leq 1/(2 \times C0 \times \omega_c^2) \tag{10-1}$$

For satisfying the expression (10-1), the dimensions in the expression (7) {including the iron core length L, the thickness t of the ground insulator, the slot width aaa, and the slot height bbb in the expression (7)}, and the dimensions in the expression (8) {including the polar pitch τ, the iron core length L, and the equivalent gap length δ} are to be properly determined.

<Fourth Embodiment>

Described in the <First embodiment>, the <Second embodiment> and the <Third embodiment> are leakage current preventive measures carried out on the PM motor's side. The leakage current preventive measures can also be carried out on the inverter's side. More specifically described as below:

The resonant frequency f0 causing the increased electrostatic capacitance of the PM motor can be measured. Therefore, the carrier frequency fc of the inverter is so adjusted as to become smaller than or equal to $1/(2^{1/2})$ times the thus measured resonant frequency f0. Otherwise, the carrier frequency fc of the inverter is so adjusted as to become greater than or equal to $2^{1/2}$ times the thus measured resonant frequency f0.

The above measures according to the fourth embodiment can bring about the same effect as that of the second embodiment. With this, the PM motor's electrostatic capacitance corresponding to the carrier frequency fc can be smaller than or equal to two times the ground electrostatic capacitance C0, thus preventing remarkable increase in the leakage current.

Although the present invention has been described above by reference to four embodiments, the present invention is not limited to the four embodiments described above. Modifications and variations of the embodiments described above will occur to those skilled in the art, in light of the above teachings.

This application is based on a prior Japanese Patent Application No. P2002-008437 (filed on Jan. 17, 2002 in Japan). The entire contents of the Japanese Patent Application No. P2002-008437 from which priority is claimed is incorporated herein by reference, in order to take some protection against mis-translation or omitted portions.

The scope of the present invention is defined with reference to the following claims.

What is claimed is:

1. A permanent magnet synchronous motor driving system, comprising:
   1) a permanent magnet synchronous motor including three phase terminals, a resonant frequency being generated between an inductance and a ground electrostatic capacitance between the following:
      a) one of the three phase terminals of the permanent magnet synchronous motor, and
      b) a ground; and
   2) an inverter for driving the permanent magnet synchronous motor, the inverter generating a carrier frequency, wherein
   the inductance and the ground electrostatic capacitance are predetermined constants, the inductance and the ground electrostatic capacitance being predetermined by a calculation based on a specification of the permanent magnet synchronous motor designed in such a manner that the resonant frequency of the permanent magnet synchronous motor is free from a conformance with the carrier frequency of the inverter and is free from a proximity of the carrier frequency of the inverter.

2. The permanent magnet synchronous motor driving system as claimed in claim 1, wherein
   the permanent magnet synchronous motor is of an inner rotor type having a stator and a rotor which is disposed inside the stator.

3. The permanent magnet synchronous motor driving system as claimed in claim 1, wherein
   the permanent magnet synchronous motor is of an outer rotor type having a stator and a rotor which is disposed outside the stator.

4. The permanent magnet synchronous motor driving system as claimed in claim 1, wherein
   the resonant frequency generated between the inductance and the ground electrostatic capacitance between the one of the three phase terminals of the permanent magnet synchronous motor and the ground is greater than or equal to substantially $2^{1/2}$ times the carrier frequency of the inverter.

5. The permanent magnet synchronous motor driving system as claimed in claim 4, wherein
   1) the resonant frequency generated between the inductance and the ground electrostatic capacitance between the one of the three phase terminals of the permanent magnet synchronous motor and the ground,
   2) the ground electrostatic capacitance, and
   3) an angular frequency of the carrier frequency of the inverter lead a following first relation:
   First relation:

$$La \times C0 \leq \frac{1}{2 \cdot \omega_c^2}$$

where La is the inductance, C0 is the ground electrostatic capacitance, and $\omega_c$ is the angular frequency.

6. The permanent magnet synchronous motor driving system as claimed in claim 5, wherein
   the first relation is based on a following second relation and a following third relation:
   Second relation:

$$f0 = \frac{1}{2\pi\sqrt{LaC0}} \geq \sqrt{2} \times fc$$

Third relation:
   where f0 denotes the resonant frequency and fc denotes the carrier frequency of the inverter.

7. The permanent magnet synchronous motor driving system as claimed in claim 1, wherein
   the ground electrostatic capacitance in a frequency range smaller than or equal to substantially 1.0 kHz between the one of the three phase terminals of the permanent magnet synchronous motor and the ground is smaller than or equal to substantially 40% of an allowable electrostatic capacitance of a protector of the permanent magnet synchronous motor driving system.

8. The permanent magnet synchronous motor driving system as claimed in claim 1, wherein
   the permanent magnet synchronous motor driving system includes an electric circuit of substantially 200 V, and
   hereinabove the ground electrostatic capacitance in a frequency range smaller than or equal to substantially 1.0 kHz between the one of the three phase terminals of the permanent magnet synchronous motor and the ground is smaller than or equal to substantially 20 nF.

9. The permanent magnet synchronous motor driving system as claimed in claim 1, wherein
   the carrier frequency of the inverter is at least one of the following two, relative to the resonant frequency generated between the inductance and the ground electrostatic capacitance between the one of the three phase terminals of the permanent magnet synchronous motor and the ground:
1) smaller than or equal to substantially $\frac{1}{2}^{1/2}$ times the resonant frequency, and
2) greater than or equal to substantially $2^{1/2}$ times the resonant frequency.

10. The permanent magnet synchronous motor driving system as claimed in claim 1, wherein
the permanent magnet synchronous motor is disposed in a place including a machine room and a hoist way of an elevator system, and
the permanent magnet synchronous motor hereinabove winds upward and downward a cage of an elevator of the elevator system.

11. The permanent magnet synchronous motor driving system as claimed in claim 1, wherein
the permanent magnet synchronous motor connects to the inverter.

12. The permanent magnet synchronous motor driving system as claimed in claim 1, wherein
the calculation of the inductance and the ground electrostatic capacitance is performed in accordance with the following two relations:

$$C0 = \frac{\varepsilon_0 \cdot \varepsilon_r \cdot (a+b) \cdot L \cdot Ns}{t}$$

$$La = 0.7 \cdot \frac{\tau \cdot L \cdot (W \cdot kw)^2}{p \cdot \delta \cdot kc \cdot ks} \cdot 10^{-6}$$

where C0 denotes the ground electrostatic capacitance, La denotes the inductance, $\varepsilon_o$ denotes a dielectric constant of vacuum ($8.854 \times 10^{-12}$ (F/m)), $\varepsilon_r$ denotes a dielectric constant of a ground insulator relative to the dielectric constant of vacuum, L denotes an iron core length (m), Ns denotes a slot number, t denotes a thickness of the ground insulator (m), a denotes a slot width (m), b denotes a slot height (m), $\tau$ denotes a polar pitch (m), W denotes the number of serial windings, kw denotes a winding coefficient, p denotes the number of pairs of poles, $\delta$ denotes an equivalent gap length (m), kc denotes a Carter's coefficient, and ks denotes a saturation coefficient.

13. The permanent magnet synchronous motor driving system as claimed in claim 1, wherein
the inductance is constant due to a polar pitch, a number of serial windings, a number of pairs of poles, and an equivalent gap length of the permanent magnet synchronous motor, and wherein
the ground electrostatic capacitance is constant due to a dielectric constant of a ground insulator relative to the dielectric constant of vacuum, an iron core length, a slot number, a thickness of the ground insulator, a slot width, and a slot height of the permanent magnet synchronous motor.

14. The permanent magnet synchronous motor driving system as claimed in claim 1, wherein the resonant frequency of the permanent magnet synchronous motor is free from a conformance with the carrier frequency of the inverter and is free from a proximity of the carrier frequency of the inverter due substantially only to the following features of the permanent magnet synchronous motor driving system:
a dielectric constant of vacuum, a dielectric constant of a ground insulator relative to the dielectric constant of vacuum, an iron core length, a slot number, a thickness of the ground insulator, a slot width, a slot height, a polar pitch, a number of serial windings, a winding coefficient, a number of pairs of poles, an equivalent gap length, Carter's coefficient, and a saturation coefficient.

15. The permanent magnet synchronous motor driving system as claimed in claim 1, wherein the resonant frequency of the permanent magnet synchronous motor is free from a conformance with the carrier frequency of the inverter and is free from a proximity of the carrier frequency of the inverter due substantially only to the design of the permanent magnet synchronous motor and the grounding of the permanent magnet synchronous motor.

16. A method of testing a permanent magnet synchronous motor driving system, the method comprising the following operations:
i) disposing on an insulated bench a permanent magnet synchronous motor of the permanent magnet synchronous motor driving system, the permanent magnet synchronous motor driving system comprising:
1) the permanent magnet synchronous motor, including three phase terminals, a resonant frequency being generated between an inductance and a ground electrostatic capacitance between the following:
a) one of the three phase terminals of the permanent magnet synchronous motor, and
b) a ground; and
2) an inverter for driving the permanent magnet synchronous motor, the inverter generating a carrier frequency, the resonant frequency of the permanent magnet synchronous motor being free from a conformance with the carrier frequency of the inverter and being free from a proximity of the carrier frequency of the inverter;
ii) measuring a ground electrostatic capacitance in a frequency range smaller than or equal to substantially 1.0 kHz, between one of the three phase terminals of the permanent magnet synchronous motor and the ground;
iii) measuring, in a high frequency range, the resonant frequency between the inductance and the ground electrostatic capacitance; and
iv) calculating a constant for determining a characteristic of an electrostatic capacitance.

17. The method of testing the permanent magnet synchronous motor driving system as claimed in claim 16, wherein
the high frequency range is greater than substantially 1.0 kHz.

18. The method of testing the permanent magnet synchronous motor driving system as claimed in claim 16, wherein the calculation of the ground electrostatic capacitance is performed in accordance with following equation:

$$C0 = \frac{\varepsilon_0 \cdot \varepsilon_r \cdot (a+b) \cdot L \cdot Ns}{t}$$

where C0 denotes the ground electrostatic capacitance, $\varepsilon_o$ denotes a dielectric constant of vacuum ($8.854 \times 10^{12}$ (F/m)), $\varepsilon_r$ denotes a dielectric constant of a ground insulator relative to the dielectric constant of vacuum, L denotes an iron core length (m), Ns denotes a slot number, t denotes a thickness of the ground insulator (m), a denotes a slot width (m), b denotes a slot height (m).

* * * * *